Oct. 31, 1933.   C. H. INGWER   1,932,548
HEEL MOLD AND METHOD OF FORMING ARTICLES
Original Filed July 26, 1928    2 Sheets-Sheet 1
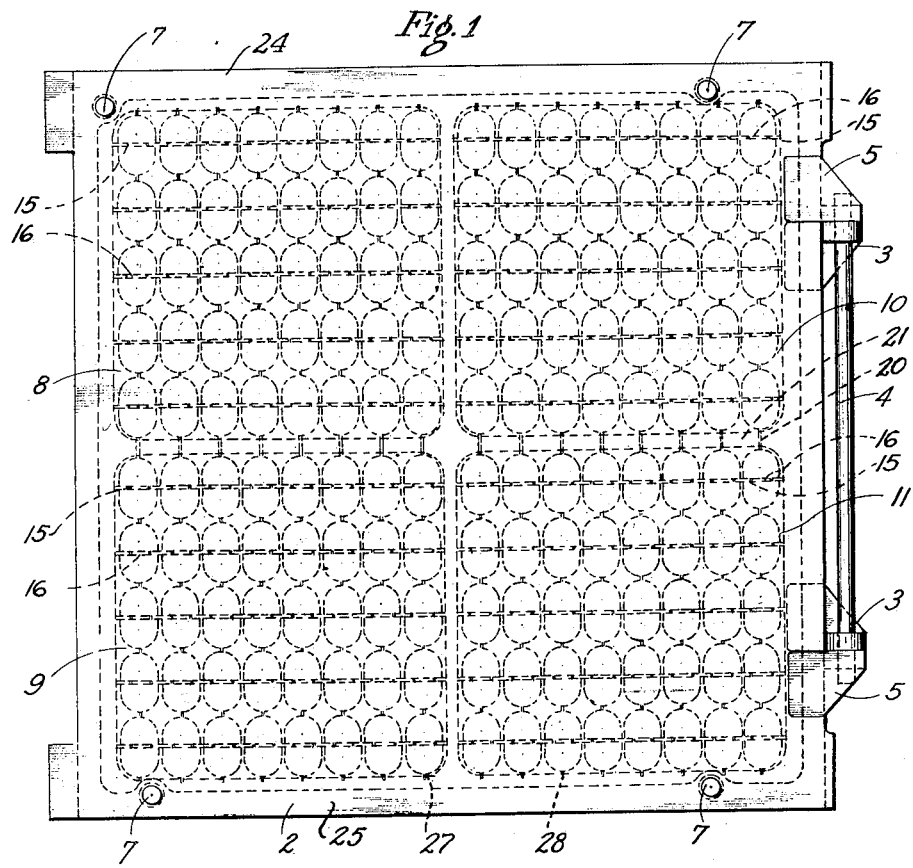
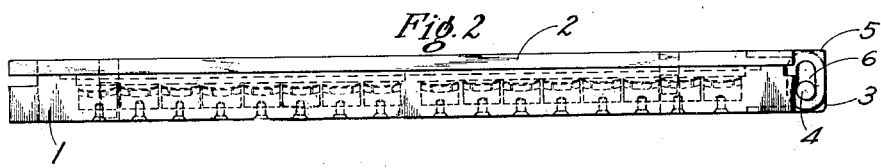
INVENTOR
Carl H. Ingwer
BY
Richey & Watts
ATTORNEYS Oct. 31, 1933.  C. H. INGWER  1,932,548
HEEL MOLD AND METHOD OF FORMING ARTICLES
Original Filed July 26, 1928   2 Sheets-Sheet 2
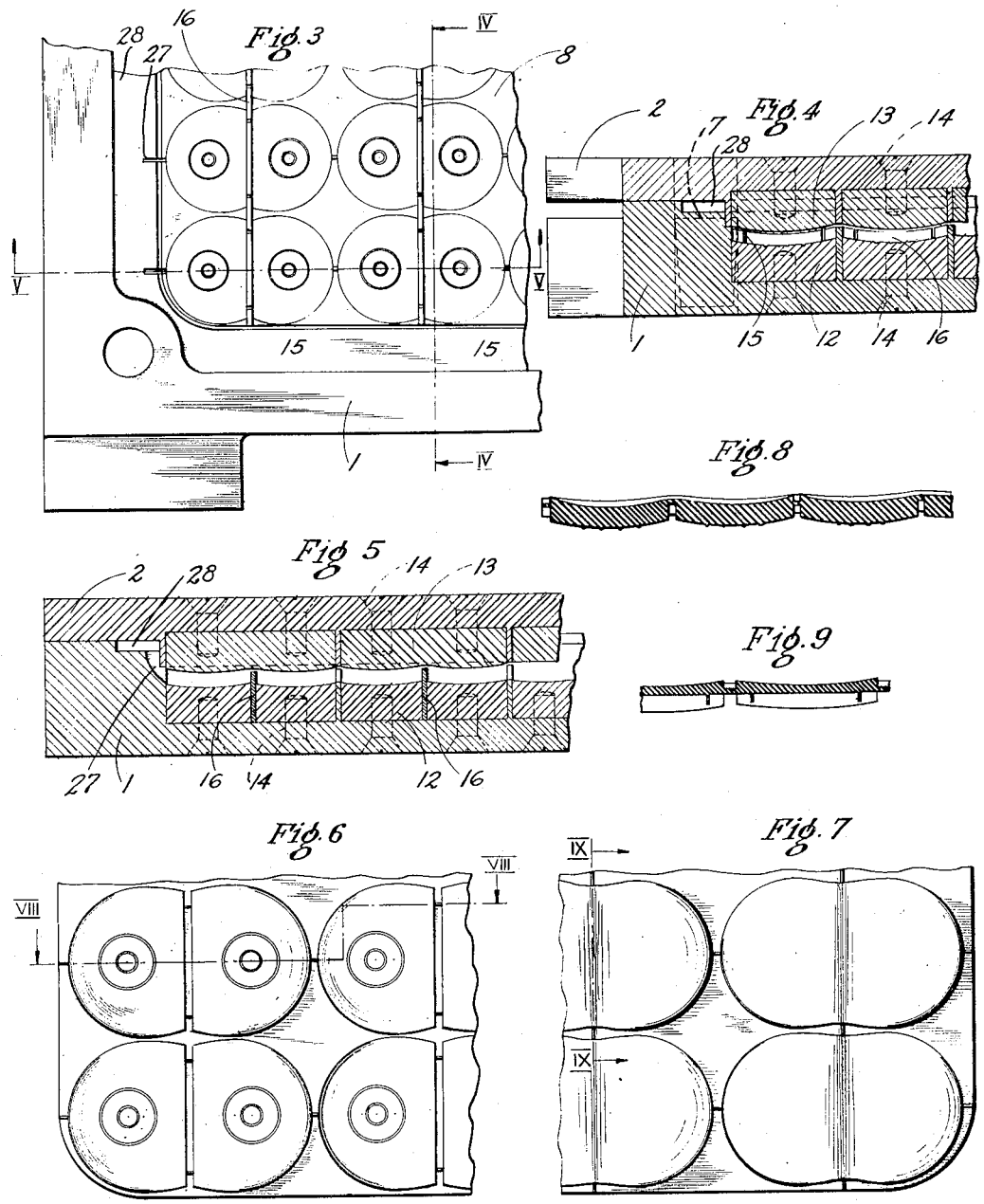

Patented Oct. 31, 1933

1,932,548

UNITED STATES PATENT OFFICE 1,932,548

HEEL MOLD AND METHOD OF FORMING ARTICLES

Carl H. Ingwer, Elyria, Ohio, assignor to The I. T. S. Company, Elyria, Ohio, a corporation of Ohio Application July 26, 1928, Serial No. 295,513
Renewed June 25, 1932

14 Claims. (Cl. 18—42)

This invention relates to a method and apparatus for forming molded articles.

The method and apparatus of the invention are particularly adaptable to the formation of articles of rubber compounds and of similar materials.

An object of my invention is to provide an apparatus by which a plurality of articles may be quickly, accurately and economically formed. Other objects will hereinafter appear.

The invention will be better understood from the description of one practical embodiment thereof illustrated in the accompanying drawings in which Fig. 1 is a plan view of the apparatus arranged to mold a plurality of sheets of shoe heel lifts shown as four sheets each comprising forty pairs of heel lifts;

Fig. 2 is an end elevation of the mold of Fig. 1;

Fig. 3 is an enlarged fragmentary plan view of the bottom half of the mold sections of the mold of Figs. 1 and 2;

Fig. 4 is a fragmentary sectional view taken on the line IV—IV of Fig. 3;

Fig. 5 is a fragmentary sectional view taken on the line V—V of Fig. 3;

Fig. 6 is a fragmentary top plan view of a completed sheet formed with the mold above referred to;

Fig. 7 is a bottom fragmentary plan view of this sheet; and

Figs. 8 and 9 are sectional views of the Figs. 6 and 7 taken on the lines VIII—VIII and IX—IX respectively.

The mold illustrated consists of a lower section 1 to which is pivoted an upper section 2. The pivotal connection is formed by projecting lugs 3 extending at the sides of the lower section and carrying a rod or shaft 4, constituting the pivot axis, which is engaged by lugs 5 on the upper section. Lugs 5 have elongated slots 6 to allow the sections to be moved towards each other or apart. Tapered dowel pins 7 are carried by the top section of the mold and engage recesses in the bottom section to positively locate the two sections relative to each other. Within the molds are spaces for forming four separate sheets of rubber heels, these being indicated at 8, 9, 10 and 11.

The lower mold section includes a plurality of filler blocks 12, the upper surfaces of which are contoured to mold the bottom surface of a heel lift, while filler blocks 13 are included as a part of the upper mold section by insertion therein, such blocks each being contoured to form the upper surfaces of two adjacent heel lifts. These blocks are retained in place within the mold section by means of screws or other suitable devices.

Hence, the lower mold section for forming a sheet of heels comprises four compartments, wherein the series of recesses are arranged in pairs and the pairs arranged in rows in both directions of the sheet, the recesses being closely adjacent to each other in both directions so that a maximum number of heels or any given size of sheet may be formed.

As will be noted from Figures 3 to 5, the recesses formed within the metal of the mold halves themselves leave partitions separating the pairs of heels from each other. The heels of each pair, however, are separated by strips of metal 16 extending throughout the width of each sheet-forming section of the mold.

As will also be noted from these figures, neither the partitions formed by the mold halves or those formed by the strips quite contact with the upper mold sections or the blocks carried thereby, so that there is room between the lift-forming recesses for a thin sheet or web connecting the lifts together. In the partitions between the recesses are cut grooves or notches 15, extending substantially the full depth of the lift-forming depressions and being rather narrow, about the width of the thickness of the web between the lifts.

As illustrated the grooves are positioned in the lower partitions closely adjacent the ends of the breast of the heels and at the central portion of the arcuate backs thereof, while in the upper mold sections the grooves are positioned at the extreme back of the heel and connecting the webs formed between the breasts of the adjacent pairs of heels.

The purpose of these notches is to permit the rubber compound to flow from one mold recess to another, preventing the pocketing of air in corners of the mold recesses and permitting the material to completely fill the same. This makes it possible to place a calendared slab of rubber between the mold halves, press the mold halves together, causing the raw rubber to fill the cavities completely, and vulcanize the sheet, eliminating the expensive labor of filling each recess separately as has heretofore been necessary, and at the same time producing perfect sheets of heels.

The heel lifts of each sheet are joined, not only by the web forming the sheet itself, but each lift is joined to adjacent lifts by several small webs normal thereto formed within the notches, these webs, however, requiring very little material and not interferring with the cutting of the heels from the sheet. These small webs that connect each lift are produced by permitting the plastic material to flow through openings 20 in the walls 21 separating the lift sections. These openings preferably extend to the depth of the heel body through the form and allow the plastic material to travel from the mold cavities in one section across to the mold cavities in the other section and through the divided wall.

It has been mentioned that the pocketing of air in the corners of the mold recesses is obviated by virtue of the notches in the partitions between the cavities which allows the air to progressively move from one cavity to the other and thus to the outside of the mold. It is to be observed, in Fig. 1, that the cavities bordering the sides 24 and 25 of the mold each have a passage 27 communicating therewith, Fig. 5, and with a trough 28 formed in the mold proper and extending entirely along each one of the edges 24 and 25, respectively. By virtue of this arrangement, communication is established between the cavities within the mold and the outside of the mold. Obviously, when the mold halves are pressed together, the plastic material is caused to flow from one cavity to another, in the zone defined by the body of the article, through the openings in the partitions and is also caused to flow to the outside of the mold through the openings 27.

While I have described the illustrated embodiment of my invention in some particularity, obviously many variations and modifications thereof will readily occur to those skilled in the art to which it appertains, and I do not, therefore, limit myself to the precise details shown and described, but claim as my invention all embodiments coming within the scope of the appended claims.

1. The method of forming a sheet provided with a plurality of articles, which comprises placing a slab of raw material between movable mold halves, said mold halves having complementary surfaces forming mold cavities, heating the halves to render said slab plastic, pressing them together to force the material into all parts of the mold cavities, permitting the material to flow through notches connecting the cavities of the mold halves between the remoter corners thereof and the connecting sheet, and while maintaining the mold halves closely adjacent each other subjecting the material to heat to cure the same.

2. Molding apparatus comprising mold halves adjacent surfaces of which are contoured to form cavities for producing articles, the surfaces between said cavities being spaced apart to form a connecting sheet integral with the articles, and notches in the walls between adjacent cavities permitting the material to flow from one recess to another and so to completely fill the same.

3. A molding apparatus comprising two mold halves, adjacent surfaces of which are contoured to form cavities for forming articles, the surfaces between said cavities being spaced apart to form a connecting sheet integral with the articles, and notches in the walls between adjacent cavities connecting the points most remote from the space in which the sheet is to be formed.

4. A molding apparatus comprising two mold halves, adjacent surfaces of which are contoured to form cavities for forming articles, the surfaces between said cavities being spaced apart to form a connecting sheet integral with the articles, and notches in the walls between adjacent cavities connecting the points most remote from the space in which the sheet is to be formed, the notches being narrow and extending the full depth of the cavities.

5. A molding apparatus comprising two mold halves, adjacent surfaces of which are contoured to form cavities for forming articles, the surfaces between said cavities being spaced apart to form a thin connecting sheet integral with the articles, and notches in the walls between adjacent cavities connecting the points most remote from the space in which the sheet is to be formed, notches being positioned on both sides of said sheet forming space and extending the full depth of the cavities.

6. A molding apparatus comprising two mold halves, connected for pivotal and translational movement relative to each other, adjacent surfaces of which are contoured to form cavities for forming articles, the surfaces between said cavities being spaced apart to form a connecting sheet integral with the articles, and notches in the walls between adjacent cavities connecting the points most remote from the space in which the sheet is to be formed.

7. A molding apparatus comprising two mold halves, connected for pivotal and translational movement relative to each other, guide means for positively locating the halves relative to each other, adjacent surfaces of which are contoured to form cavities for forming articles, filler blocks in said recesses, the exposed faces of which are adapted to mold the upper and lower surfaces of the articles, the surface between said cavities being spaced apart to form a connecting sheet integral with the articles, and notches in the walls between adjacent cavities connecting the points most remote from the space in which the sheet is to be formed.

8. The method of forming a sheet provided with a plurality of heel lifts, which comprises placing a slab of raw rubber compound material between movable mold halves, heating the halves to render said slab plastic, pressing them together to force the material into all parts of the mold cavities, permitting the material to flow through notches connecting the recesses of the mold halves between the remote corners thereof and the connecting sheet, and while maintaining the mold halves closely adjacent each other subjecting the material to heat to vulcanize the same.

9. The method of forming a sheet provided with a plurality of articles which consists in placing a slab of material between movable mold halves adapted to cooperate to form a plurality of mold cavities, heating the material to render it plastic, forcing the mold halves together to distribute the material to all parts of the mold cavities, causing the material to flow from one mold cavity to another in the zone defined by the bodies of the articles.

10. The method of forming a sheet provided with a plurality of heels, having at least one concave surface, which consists in placing a slab of material between movable mold halves having the opposed surfaces contoured to form a plurality of mold cavities having at least one concave surface, heating the material to render it plastic, forcing the mold halves together to distribute the material to all parts of the mold cavities and causing at least a portion of the material to flow from one mold cavity to another in the zone defined by the major portion of the bodies of the articles.

11. Molding apparatus comprising two mold parts having surfaces contoured to form cavities for producing a series of rubber heels, the proximate surfaces of the mold parts being spaced apart to form a connecting sheet integral with the heels, walls separating adjacent cavities, openings in said walls extending to the full depth of the cavities whereby the material to be molded may flow from one cavity to the other in the zone between the top and bottom surfaces of the heels being formed.

12. Molding apparatus comprising an upper and a lower mold section, the proximate surfaces of which are contoured to form a plurality of cavities when in closed position, partitions between said cavities anchored in the lower of said mold sections, the top edge of said partitions being spaced from the surface of said upper mold section, openings in said partitions extending in a vertical direction therein in the zone of the partition between the top surface of the lower mold section and the upper edge of the partitions whereby the major portion of the material in the mold cavities is prevented from flowing from one mold cavity to the other and a relatively small portion of the material is allowed to pass from one mold cavity to the other in the zone defined by the body of the article being formed.

13. The method of forming a sheet of heel bodies having at least one concave surface, said bodies being connected in the zone defined by one plane surface and in the zone defined by the major portion of the body which consists in placing a slab of material between the movable mold halves having a plurality of cavities for forming said heel bodies, subjecting the material to heat and to pressure and causing a portion of the material to flow from one mold cavity to another in the zone defined by the body portion of the article to be formed and causing a portion of the material to flow between the one plane surface of the articles to the other to form a connecting sheet integral with all of the articles.

14. The method of forming a sheet of heel bodies, each of said heel bodies having an attaching surface and a tread surface and wherein each of said heel bodies is connected to the next adjacent heel body at the attaching surface by a connecting web integral with each and wherein each heel body is connected to the next adjacent heel body at spaced points in the zone defined by the body of the heel which consists in placing a slab of material between the movable mold halves adapted to co-operate to form cavities, subjecting the material to heat and to pressure, allowing the material an unhindered flow in the zone defined by the attaching surfaces of the articles and hindering the flow in the zone defined by the body portion of the articles except at spaced points.

CARL H. INGWER.